(12) United States Patent
Choi et al.

(10) Patent No.: US 12,269,457 B2
(45) Date of Patent: Apr. 8, 2025

(54) HYBRID ELECTRIC VEHICLE AND CONTROL METHOD THEREOF

(71) Applicants: HYUNDAI MOTOR COMPANY, Seoul (KR); KIA CORPORATION, Seoul (KR)

(72) Inventors: Jae Young Choi, Seoul (KR); Hoon Han, Hwaseong-si (KR); Gwang Il Du, Ansan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 235 days.

(21) Appl. No.: 17/976,201

(22) Filed: Oct. 28, 2022

(65) Prior Publication Data

US 2023/0347869 A1 Nov. 2, 2023

(30) Foreign Application Priority Data

Apr. 27, 2022 (KR) .......................... 10-2022-0052245

(51) Int. Cl.
*B60W 20/15* (2016.01)
*B60K 6/54* (2007.10)
*B60W 30/20* (2006.01)

(52) U.S. Cl.
CPC ............. *B60W 20/15* (2016.01); *B60K 6/54* (2013.01); *B60W 30/20* (2013.01); *B60W 2030/203* (2013.01); *B60W 2510/082* (2013.01); *B60W 2510/1005* (2013.01); *B60W 2510/102* (2013.01); *B60W 2710/083* (2013.01)

(58) Field of Classification Search
CPC ...... B60W 10/08; B60W 20/40; B60W 20/15; B60W 10/02; B60W 10/26; B60K 6/36; B60K 6/48; B60K 6/485; B60K 6/365; B60K 6/52; F04B 49/065
See application file for complete search history.

(56) References Cited

U.S. PATENT DOCUMENTS

| 8,257,213 | B2 | 9/2012 | Komada et al. | |
|---|---|---|---|---|
| 8,506,451 | B2 | 8/2013 | Takami et al. | |
| 2003/0074115 | A1* | 4/2003 | Yamaguchi | B60W 10/26 903/918 |
| 2007/0056784 | A1 | 3/2007 | Joe et al. | |
| 2011/0029177 | A1* | 2/2011 | Yeung | B60K 6/52 180/65.21 |

(Continued)

FOREIGN PATENT DOCUMENTS

| JP | 2011207411 A | 10/2011 |
|---|---|---|
| KR | 20210003978 A | 1/2021 |
| KR | 102250117 B1 | 5/2021 |

*Primary Examiner* — Yuri Kan
(74) *Attorney, Agent, or Firm* — Lempia Summerfield Katz LLC

(57) ABSTRACT

A method for controlling a hybrid electric vehicle includes: connecting a first motor directly connected to an engine to a second motor directly connected to a transmission input terminal through a dual mass flywheel; determining a target angular acceleration of the first motor according to a gear shifting progress rate so that an angular acceleration of the first motor follows a target angular acceleration of the transmission input terminal when a gearshift is performed in the transmission; and controlling a torque of the first motor based on the target angular acceleration of the first motor.

19 Claims, 6 Drawing Sheets

(56) References Cited

U.S. PATENT DOCUMENTS

| | | | |
|---|---|---|---|
| 2013/0046427 A1* | 2/2013 | Hohenberg | B60K 6/365 |
| | | | 180/65.265 |
| 2013/0239750 A1* | 9/2013 | Schiek | B60K 6/485 |
| | | | 903/902 |
| 2013/0260937 A1* | 10/2013 | Van Druten | B60K 6/48 |
| | | | 475/5 |
| 2014/0287869 A1* | 9/2014 | Kato | B60W 10/02 |
| | | | 477/3 |
| 2017/0089450 A1* | 3/2017 | Barone | F04B 49/065 |
| 2019/0100206 A1 | 4/2019 | Liwell et al. | |
| 2020/0094842 A1* | 3/2020 | Chang | B60W 20/15 |
| 2023/0121971 A1* | 4/2023 | Beck | B60K 6/36 |
| | | | 475/5 |
| 2023/0365115 A1* | 11/2023 | Choi | B60W 20/40 |

* cited by examiner

HYBRID ELECTRIC VEHICLE AND CONTROL METHOD THEREOF

CROSS REFERENCE TO RELATED APPLICATION

The present application claims priority to Korean Patent Application No. 10-2022-0052245, filed Apr. 27, 2022, the entire contents of which are incorporated herein by reference.

FIELD

The present disclosure relates to a hybrid electric vehicle and a control method thereof that can alleviate the shock when a shift clutch is engaged.

BACKGROUND

The statements in this section merely provide background information related to the present disclosure and may not constitute prior art.

Recently, in line with increasing environmental interests, there has been increasing use of eco-friendly vehicles having an electric motor as a power source. Examples of eco-friendly vehicles include a hybrid electric vehicle (HEV) and an electric vehicle (EV).

The hybrid electric vehicle can provide an optimal output and torque depending on how the engine and electric motor are harmoniously operated during the process of driving with two power sources configured with an engine and an electric motor.

In particular, in hybrid electric vehicles employing a parallel type or transmission mounted electric drive (TMED) type hybrid electric system equipped with an electric motor and an engine clutch (EC) between the engine and the transmission, the output of the engine and the electric motor may be simultaneously transmitted to a drive shaft.

When gear shifting in a transmission is performed, particularly during the process of upper shifting, the vehicle may perform an intervention control to decrease the torque of the driving source to protect the clutch and reduce the kinetic energy of a transmission input terminal.

Meanwhile, a dual mass flywheel (DMF) is disposed on the output side of the engine, which may perform a function of dampening vibration generated in the driving of the engine by arranging an arc damping spring between two flywheels.

However, when the intervention control is performed through the electric motor during a gearshift, the spring inside the dual mass flywheel is abnormally stretched and compressed due to the difference in inertia between the electric motor and the engine, which may generate a difference in angular velocity between the engine and the transmission input terminal. The difference in angular velocity between the engine and the transmission input terminal may cause shift shock when a shift clutch is engaged.

The foregoing is intended merely to aid in the understanding of the background of the present disclosure, and is not intended to mean that the statement in this Background section falls within the purview of the related art that is already known to those having ordinary skill in the art.

SUMMARY

The present disclosure has been made in view of the above problems, and it is an object of the present disclosure to provide a hybrid electric vehicle and a control method thereof that can alleviate the shock when a shift clutch is engaged by controlling an angular velocity of an engine to be synchronized with a target angular velocity of a transmission input terminal when shift intervention control is performed.

It should be understood that technical objects to be achieved by the present disclosure are not limited to the aforementioned technical objects, and other technical objects not described herein should be clearly understood by those having ordinary skill in the art to which the present disclosure pertains.

In one embodiment of the present disclosure, a method for controlling a hybrid electric vehicle comprises: connecting a first motor directly connected to an engine to a second motor directly connected to a transmission input terminal through a dual mass flywheel; and determining a target angular acceleration of the first motor according to a gear shifting progress rate so that the angular acceleration of the first motor follows the target angular acceleration of the transmission input terminal when a gearshift is performed in the transmission. The method further includes controlling a torque of the first motor based on the target angular acceleration of the first motor.

According to an embodiment of the present disclosure, a hybrid electric vehicle comprises: an engine; a first motor directly connected to the engine; a second motor selectively connected to the first motor; a transmission having an input terminal directly connected to the second motor; and a controller. In particular, in a state where the first motor and the second motor are connected through a dual mass flywheel and performing a gearshift in the transmission, the controller determines a target angular acceleration of the first motor according to the gear shifting progress rate so that the angular acceleration of the first motor follows the target angular acceleration of the transmission input terminal when a gearshift is performed in the transmission. The controller also controls a torque of the first motor based on the target angular acceleration of the first motor.

According to the present disclosure, when a gearshift intervention control is performed, the angular acceleration of a motor directly connected to the engine is controlled to follow the target angular acceleration of the transmission input terminal according to a gearshift progress rate, thereby alleviating shift shock when a shift clutch is engaged, and improving durability of the transmission.

In addition, in the case the number of intervention control increases according to the motor, which is directly connected to the transmission input terminal when there is a gearshift, the shift shock can be alleviated when the shift clutch is engaged by the motor directly connected to the engine, thereby improving the power consumption of the hybrid electric vehicle and reducing an actual shift section.

It will be appreciated by persons skilled in the art that that the effects that can be achieved with the present disclosure are not limited to what has been particularly described herein above and other advantages of the present disclosure will be more clearly understood from the following detailed description taken in conjunction with the accompanying drawings.

BRIEF DESCRIPTION OF THE DRAWINGS

In order that the disclosure may be well understood, there will now be described various forms thereof, given by way of example, reference being made to the accompanying drawings, in which.

Figure 1:
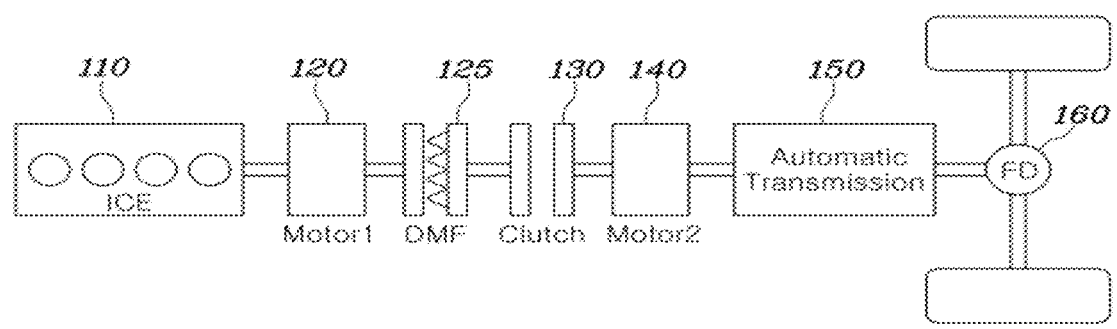
FIG. 1 is a view showing an example of a configuration of a powertrain of a hybrid electric vehicle according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in greater detail with reference to the accompanying drawings. In describing the present disclosure, for ease of understanding, the same reference numerals are used to denote the same components throughout the drawings, and repetitive description on the same components has been omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein has been omitted when it may make the subject matter of the embodiments disclosed in the present specification rather unclear. In addition, the accompanying drawings are provided only for a better understanding of the present disclosure and are not intended to limit technical ideas, application, or use. Therefore, it should be understood that the accompanying drawings include all modifications, equivalents and substitutions within the scope and spirit of the present disclosure.

It should be understood that although the terms "first," "second," etc., may be used herein to describe various components, these components should not be limited by these terms. These terms are only used to distinguish one component from another component.

It should be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it should be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

When a component, device, element, or the like of the present disclosure is described as having a purpose or performing an operation, function, or the like, the component, device, or element should be considered herein as being "configured to" meet that purpose or to perform that operation or function.

In addition, a unit or a control unit in a name such as a motor control unit (MCU), and a hybrid control unit (HCU) is a term widely used in the name of a controller that controls a vehicle-specific function and does not imply to a general function unit. For example, each controller is a communication device that communicates with other controllers or sensors to control the function that is responsible for, a memory that stores an operating system or logic commands and input/output information, and one or more processor that performs determination, calculation, decision, and the like, which is necessary for the control the function that is responsible therefor.

Prior to explaining a hybrid electric vehicle and a control method thereof according to an embodiment of the present disclosure, descriptions are firstly made on the structure of an electrified vehicle and control system capable of applying to embodiments.

FIG. 1 is a view showing an example of a configuration of a powertrain of a hybrid electric vehicle according to an embodiment of the present disclosure.

In FIG. 1, the powertrain of the hybrid electric vehicle includes two motors (i.e., a first motor 120 and a second motor 140), which are mounted between an internal combustion engine (ICE) 110 and a transmission 150, and an engine clutch 130, which employs a parallel type hybrid system. Such a parallel type hybrid system is also called a transmission mounted electric drive (TMED) hybrid electric system since the second motor 140 is always connected to an transmission input terminal 150.

In one embodiment, the first motor 120, among the two motors 120 and 140, is disposed between the engine 110 and one end of the engine clutch 130. An engine shaft of the engine 110 and a first motor shaft of the first motor 120 are variably connected to rotated together at all times. A dual mass flywheel (DMF) 125 includes a first flywheel connected to the first motor 120 and a second flywheel connected to one end of the engine clutch 130 in order to smoothly transmit the driving power to a transmission 150 of the engine 110. The DMF further includes a damping spring disposed between the two flywheels.

In one embodiment, one end of a second motor shaft of the second motor 140 may be connected to the other end of the engine clutch 130, and the other end of the second motor shaft may be directly connected to the transmission input terminal 150. The second motor 140 may be selectively connected to the first motor 120 according to a driving mode.

The second motor 140 is configured to generate an output greater than an output by the first motor 120, and thus the second motor 140 may operate as a driving motor. In addition, the first motor 120 may operate as a starter motor to crank the engine 110 when the engine 110 starts. When the engine is off, the rotational energy of the engine 110 can be converted to electric energy through power generation. In other words, the electric power generation may be performed with the power of the engine 110 while the engine 110 is in operation.

As shown in FIG. 1, when a driver depresses an accelerator pedal after starting (for example, HEV Ready), in the hybrid electric vehicle having the powertrain, the second motor 140 may be driven using the electrical power of a battery (not shown) in a state in which the engine clutch 130 is opened. Accordingly, the power of the second motor 140 passes through the transmission 150 and a final drive (FD) 160 to move a wheel (i.e., EV mode) of the vehicle. When the vehicle is gradually accelerated and larger driving force is required, the first motor 120 may operate to crank the engine 110.

After the engine 110 is started, and the difference in rotational velocity between the engine 110 and the second motor 140 is within a predetermined range, the engine clutch 130 is engaged, and the engine 110 and the second motor 140 may be rotated together (i.e., a transition from EV mode to HEV mode). Accordingly, through a torque blending process, the output of the second motor 140 may be decreased, and the output of the engine 110 is increased, therefore a driver required torque may be satisfied. In the HEV mode, most of the required torque may be satisfied from the engine 110, the difference between engine torque and the required torque may be compensated through at least one of the first motor 120 and the second motor 140. For example, when the engine 110 outputs a torque higher than the required torque considering the efficiency of the engine 110, either the first motor 120 or the second motor 140 may generate electric power in the extent of the redundancy of the engine torque. When the engine torque is insufficient than the required torque, at least one of the first motor 120 and the second motor 140 may output the deficit torque.

In a predetermined engine off condition, such as a decelerating vehicle, is satisfied, the engine clutch 130 may be opened and the engine 110 may be stopped (i.e., a transition from HEV mode to EV mode). When decelerating, by using the driving force of the wheel, a battery may be recharged through the second motor 140, which is referred to as braking energy regeneration or regenerative braking.

In general, the transmission 150 may use a discrete variable transmission or a multiple-disc clutch, such as a dual clutch transmission (DCT).

Figure 2:
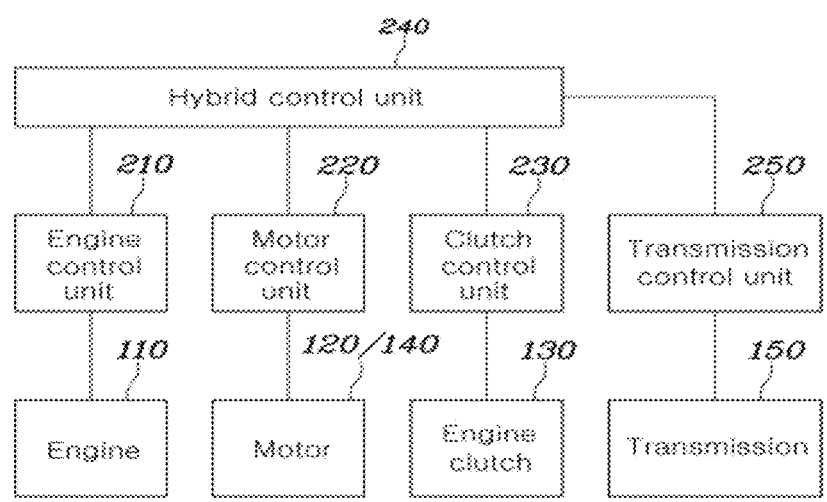
FIG. 2 is a view showing an example of a configuration of a control system of a hybrid electric vehicle according to an embodiment of the present disclosure.

FIG. 2 is a view showing an example of a configuration of a control system of a hybrid electric vehicle according to an embodiment of the present disclosure.

In FIG. 2, the engine 110 of the hybrid electric vehicle to which embodiments of the present disclosure can be applied may be controlled by an engine control unit 210. The first motor 120 and the second motor 140 may be controlled by a motor control unit (MCU) 220, and the engine clutch 130 may be controlled by a clutch control unit 230, respectively. Here, the engine control unit 210 is also referred to as an engine control system (EMS). In addition, the transmission 150 may be controlled by a transmission control unit 250.

The MCU 220 transmits a pulse width modulation (PWM) control signal to a gate drive unit (not shown) based on a motor angle, phase voltage, phase current, required torque, and the like, of the each of the motors 120 and 140. The gate drive unit may control an inverter (not shown) that drives each of the motors 120 and 140 accordingly.

Each control unit may be connected to a hybrid control unit (HCU) 240 that controls the overall powertrain including a mode switching process, which is an upper-level control unit thereof. Each control unit may provide the HCU 240 with the information required to control the engine clutch when shifting gears or changing driving mode, and/or the information required to stop the engine according to the control of the HCU 240, or perform an operation according to a control signal.

For example, the HCU 240 may determine whether to perform switching between EV-HEV modes or CD-CS mode (in the case of PHEV) according to the driving state of the vehicle. To this end, the HCU 240 determines when the engine clutch 130 is opened and performs a hydraulic control when opened. In addition, the HCU 240 may determine a state (e.g., a lock-up state, a slip state, an open state, and the like) of the engine clutch 130, and may control the timing of stopping the fuel injection of the engine 110. In addition, the HCU 240 may send a torque command for controlling the torque of the first motor 120 to the MCU 220 for an engine stop control, thereby controlling the recovery of the engine rotational energy. In addition, the HCU 240 determines the state of each of the drive sources (i.e., the engine 110, the first motor 120, and the second motor 140) to satisfy the required torque and determines the required drive force to be shared by each of the drive sources 110, 120, and 140 according to the respective drive source, in which the each of the drive sources may send the torque command to the control units 210 and 220.

It should be apparent to those having ordinary skill in the art that the connection relationship aforementioned and the function/classification of each control unit are exemplary and is non-limited by its name. For example, the HCU 240 may be implemented such that the corresponding function is provided by being replaced by one of the other control units or may be provided in a distributed manner in two or more of the other control units.

It should be apparent to those having ordinary skill in the art that the configurations aforementioned of FIGS. 1 and 2 are only examples of the hybrid electric vehicle, and the hybrid electric vehicle applicable to the embodiment is not limited to such a configuration.

In another embodiment, when the hybrid electric vehicle performs a shift intervention control through the second motor 140 directly connected to a transmission input terminal, the spring inside of the DMF 125 may be abnormally stretched and compressed due to the difference in inertia between the engine 110 and the second motor 140. Consequently, there may be a difference in angular velocity between the engine 110 and the transmission input terminal, and such a difference in angular velocity is a factor that generates a shock when the shift clutch is engaged.

Accordingly, in an embodiment of the present disclosure, when the shift intervention control is performed in the HEV mode, the angular velocity of the engine 110 is synchronized with the target angular velocity of the transmission input terminal through the first motor 120 directly connected to the engine 110, thereby proposing a hybrid electric vehicle that can alleviate the shock when the shift clutch is engaged. A configuration for such a proposal is shown in FIG. 3.

Figure 3:
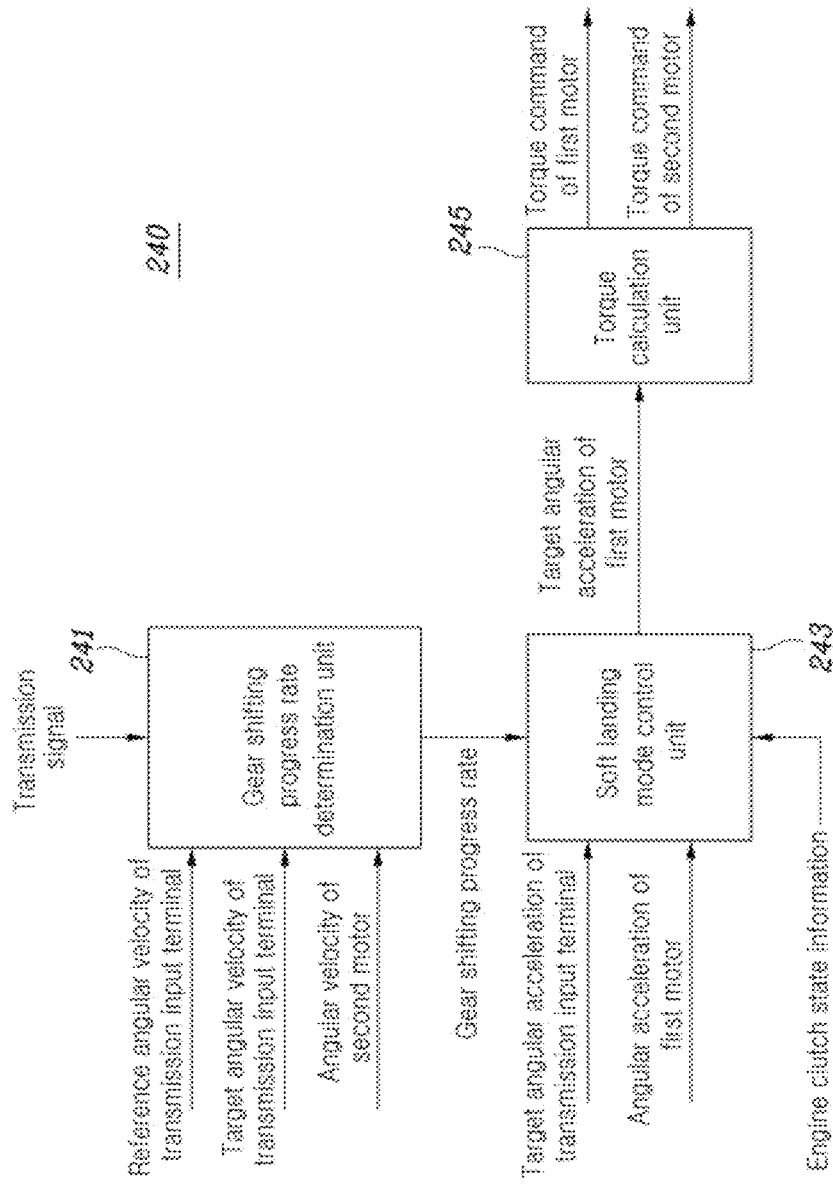
FIG. 3 is a block diagram showing a configuration of a hybrid control unit according to an embodiment of the present disclosure.

FIG. 3 is a block diagram showing a configuration of a hybrid control unit 240 according to an embodiment of the present disclosure.

In FIG. 3, the hybrid control unit (HCU) 240 may include: a gear shifting progress rate determination unit 241 determining a gear shifting progress rate with respect to the actual shift section when the gear shifting is performed in the transmission 150. The HCU 240 further includes a soft landing mode control unit 243 determining a target angular acceleration of the first motor 120 based on the gear shifting progress rate, and a torque calculation unit 245 sending respective torque command to the first motor 120 and the second motor 140 to the MCU 220 based on the target angular acceleration of the first motor 120. The actual shift section may be defined as a section in which the gear ratio of the transmission 150 is changed from the gear ratio of a currently engaged gear to the gear ratio of a target gear.

The gear shifting progress rate determination unit 241, when a gearshift is performed in the transmission 150, may receive a transmission signal from the transmission control unit 250.

Once the transmission signal is received, based on a reference angular velocity of the transmission input terminal, the gear shifting progress rate determination unit 241 may determine the gear shifting progress rate on the actual shift section according to a difference between the target angular velocity of the transmission input terminal and the angular velocity of the second motor 140. Here, the reference angular velocity of the transmission input terminal may be determined by multiplying the gear ratio of the currently engaged gear by the angular velocity of an output terminal of the transmission. The target angular velocity of the transmission input terminal may be determined by multiplying the gear ratio of the target gear by the angular velocity of the output terminal of the transmission.

Since the angular velocity of the second motor 140 directly connected to the transmission input terminal represents the current angular velocity of the transmission input terminal, the gear shifting progress rate may increase as the angular velocity of the second motor 140 approaches the target angular velocity of the transmission input terminal.

More specifically, the equation in which the gear shifting progress rate determination unit 241 calculates the gear shifting progress rate is as follows:

$$\text{Gear shifting progress rate (\%)} = \frac{\text{Reference angular velocity of transmission input terminal} - \text{Angular velocity of second motor}}{\text{Reference angular velocity of transmission input terminal} - \text{Target angular velocity of transmission input terminal}}$$

Equation 1

Referring to Equation 1, the gear shifting progress rate may be determined according to a ratio of difference between a reference angular velocity of the transmission input terminal and an angular velocity of the second motor 140 to difference between a reference angular velocity of the transmission input terminal and a target angular velocity of the transmission input terminal.

The soft landing mode control unit 243 may determine whether to enter the soft landing mode based on the gear shifting progress rate for the actual shift section and engine clutch state information received from the clutch control unit 230. In addition, when entering the soft landing mode, the soft landing mode control unit 243 may determine the target angular acceleration of the first motor 120 according to the gear shifting progress rate thereby the angular acceleration of the first motor 120 follows the target angular acceleration of the transmission input terminal. Here, the target angular acceleration of the transmission input terminal is a rate of change with respect to the target angular velocity of the transmission input terminal.

The soft landing mode may be a mode for controlling each acceleration of the first motor 120 directly connected to the engine 110 to follow a target angular acceleration of the transmission input terminal in order to alleviate a shift shock caused by an angular velocity difference between the engine 110 and the transmission input terminal, when the actual shift section ends (that is, when the shift clutch is engaged). In other words, since the angular acceleration (or angular velocity) of the first motor 120 directly connected to the engine 110 is the same angular as the angular acceleration (or angular velocity) of the engine 110, the angular velocity of the engine 110 may be controlled to be synchronized with the target angular velocity of the transmission input terminal.

Unlike the present embodiment, to reduce an angular velocity difference between the engine 110 and the transmission input terminal, there is a method of limiting the amount of intervention control according to the second motor 140 that is directly connected to the transmission input terminal or increasing an actual shift section. However, this method for limiting the intervention control amount is disadvantageous in terms of fuel efficiency of the hybrid electric vehicle, and the method of increasing the actual shift section may cause a gearshift delay.

In comparison, the HCU 240 according to the present embodiment performs the soft landing mode through the first motor 120 directly connected to the engine 110, thereby alleviating shift shock generated when the shift clutch is engaged. By releasing the limitation of the amount of intervention control according to the second motor 140 directly connected to the transmission input terminal, the fuel efficiency of the hybrid electric vehicle may be improved and the actual shift section may be reduced.

First, to enter the soft landing mode, the soft landing mode control unit 243 may determine whether the first motor 120 is connected to the second motor 140 via the DMF 125 through the coupling of the engine clutch 130 based on the engine clutch state information.

The soft landing mode control unit 243 may determine whether to enter the soft landing mode when the gear shifting progress rate is greater than or equal to a predetermined progress rate in a state in which the first motor 120 is connected to the second motor 140 via the DMF 125. For example, when the gear shifting progress rate is greater than or equal to 80%, the soft landing mode control unit 243 may determine to enter the soft landing mode.

In the case of entering the soft landing mode, the equation by which the soft landing mode control unit 243 calculates the target angular acceleration of the first motor 120 is as follows:

Target angular acceleration of first motor=Angular acceleration of first motor+Amount of angular acceleration correction    Equation 2

The amount of angular acceleration correct is calculated as in Equation 3:

$$\text{Amount of angular acceleration correction} = \frac{\text{Angular acceleration difference } ( = \text{target angular acceleration of transmission input terminal} - \text{angular acceleration of first motor}}{\text{Residual rate of actual shift section } ( = 100 - \text{gear shifting progress rate})}$$

Referring to Equation 2, the soft landing mode control unit 243 may calculate the sum of the angular acceleration of the first motor 120 and the amount of angular acceleration correction as the target angular acceleration of the first motor 120.

Referring to Equation 3, the soft landing mode control unit 243 may determine an angular acceleration difference by subtracting an angular acceleration of the first motor 120 from the target angular acceleration of the transmission input terminal. The soft landing mode control unit 243 may determine the amount of angular acceleration correction according to a ratio of the angular acceleration difference and a residual rate of the actual shift section. Here, the soft landing mode control unit 243 may determine the residual rate of the actual shift section (i.e., a value obtained by subtracting the gear shifting progress rate from 100(%) of the actual shift section) based on the gear shifting progress rate with respect to the actual shift section.

In the present embodiment, the soft landing mode control unit 243 calculates the amount of angular acceleration correction in consideration of only a difference in angular acceleration and a residual rate of an actual shift section, but according another embodiment, an amount of angular acceleration correction may be calculated by considering the rate of change of revolution per minute (RPM).

In other embodiment, the soft landing mode control unit 243 may update the target angular acceleration of the first motor 120 according to the gear shifting progress rate from the time of entering the soft landing mode to the end of the actual shift section. Accordingly, the angular acceleration of the first motor 120 may gradually follow the target angular acceleration of the transmission input terminal.

By sending a torque command of the first motor 120 corresponding to the target angular acceleration of the first motor 120 to the MCU 220, the torque calculation unit 245 may control the angular acceleration of the first motor 120. At this point, in order to minimize the behavior of the hybrid electric vehicle before and after angular acceleration control of the first motor 120, the torque calculation unit 245 may constantly control the sum of torque variations of the first motor 120 and the second motor 140.

More specifically, when the target angular acceleration of the first motor 120 is greater than the angular acceleration of the first motor 120, the torque calculation unit 245 may increase the torque of the first motor 120 and decrease the torque of the second motor 140 by the torque increase amount of the first motor 120. Likewise, when the target angular acceleration of the first motor 120 is less than the angular acceleration of the first motor 120, the torque calculation unit 245 may decrease the torque of the first motor 120 and increase the torque of the second motor 140 by the amount of torque decreased of the first motor 120.

Unlike present embodiment, to minimize the behavior of the hybrid electric vehicle before and after the angular acceleration control of the first motor 120, the torque of the engine 110 may be controlled instead of the second motor 140.

Figure 4:
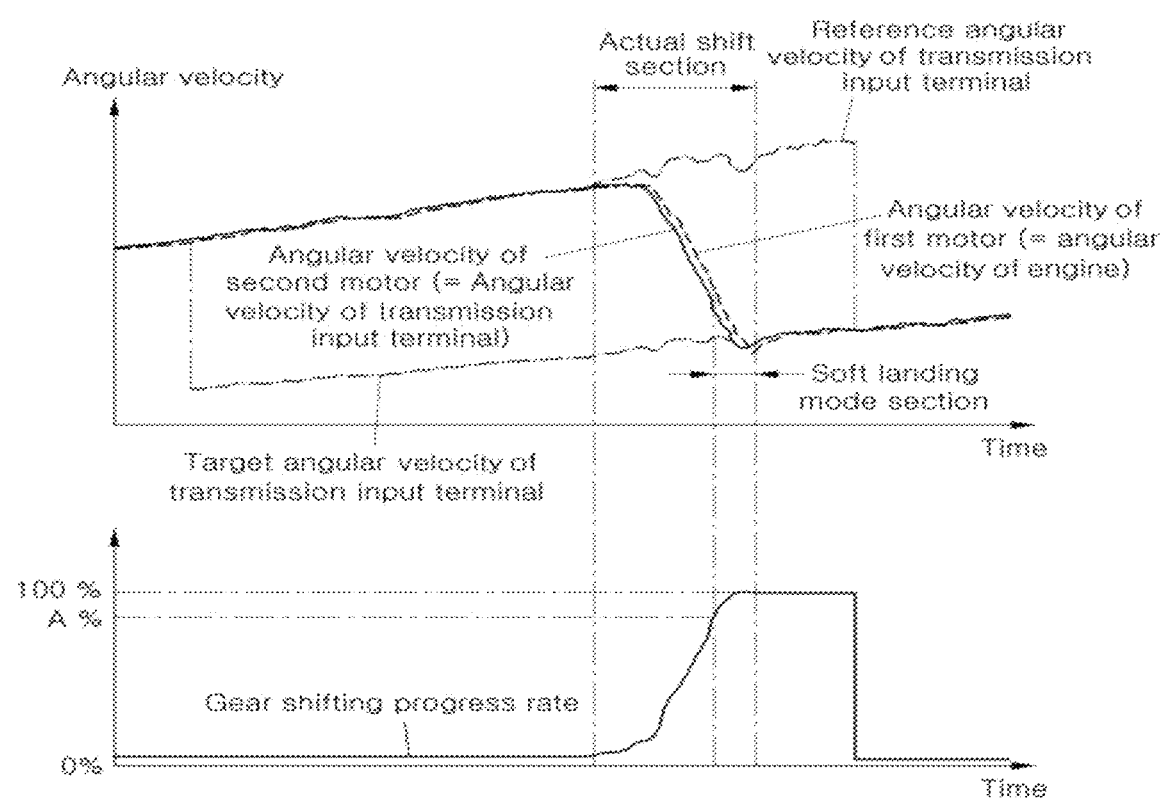
FIG. 4 is a view showing variations of angular velocity of a power source and a transmission input terminal according to a gear shifting progress rate in a hybrid electric vehicle according to an embodiment of the present disclosure.

FIG. 4 is a view showing variations of angular velocity of a power source and a transmission input terminal according to a gear shifting progress rate in a hybrid electric vehicle according to an embodiment of the present disclosure.

In FIG. 4, the gear shifting progress rate for the actual shift section is determined by a ratio of the difference between the reference angular velocity of the transmission input terminal and the angular velocity of the second motor 140 to the difference between the reference angular velocity of the transmission input terminal and the target angular velocity of the transmission input terminal.

When entering the actual shift section, intervention control according to the second motor 140 directly connected to the transmission input terminal is performed, and the angular velocity curve of the engine 110 is changed. Thereafter, when the actual shift section ends, the intervention control according to the second motor 140 is ended, and the angular velocity curve of the engine 110 again is changed. In this case, since the inertia of the engine 110 is greater than that of the second motor 140, a spring inside the DMF 125 is abnormally compressed or stretched, thus an angular velocity difference between the engine 110 and the transmission input terminal occurs. When the actual shift section ends (i.e., when the shift clutch is engaged), the difference in angular velocity between the engine 110 and the transmission input terminal can be a factor that causes a shift shock.

Accordingly, the hybrid electric vehicle according to the present embodiment may enter the soft landing mode when the shifting progress is greater than or equal to a predetermined progress rate 'A', and control each angular acceleration of the first motor 120 directly connected to the engine 110 to follow the target angular acceleration of the transmission input terminal, the angular velocity of the engine 110 may be synchronized with the target angular velocity of the transmission input terminal.

An operation of controlling the angular acceleration of the first motor 120 during the period in which the soft landing mode is performed is described with reference to FIG. 5.

Figure 5:
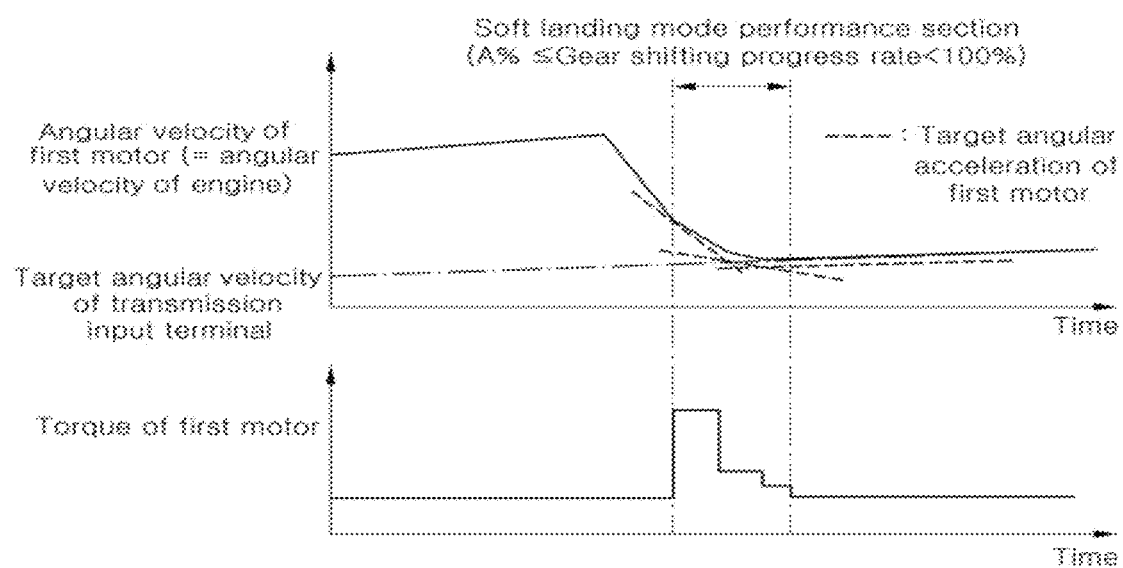
FIG. 5 is a view showing a progress that a soft landing mode is performed in a hybrid electric vehicle according to an embodiment of the present disclosure.

FIG. 5 is a view showing a progress that a soft landing mode is performed in a hybrid electric vehicle according to an embodiment of the present disclosure.

In FIG. 5, the target angular acceleration of the first motor 120 is updated according to the gear shifting progress rate during the section in which the soft landing mode is performed, and the torque of the first motor 120 corresponds to the updated target angular acceleration of the first motor 120.

Accordingly, the angular acceleration of the first motor 120 may gradually follow the target angular acceleration of the transmission input terminal while the soft landing mode is performed, and the angular velocity of the engine 110 may be synchronized by the target angular velocity of the transmission input terminal.

Figure 6:
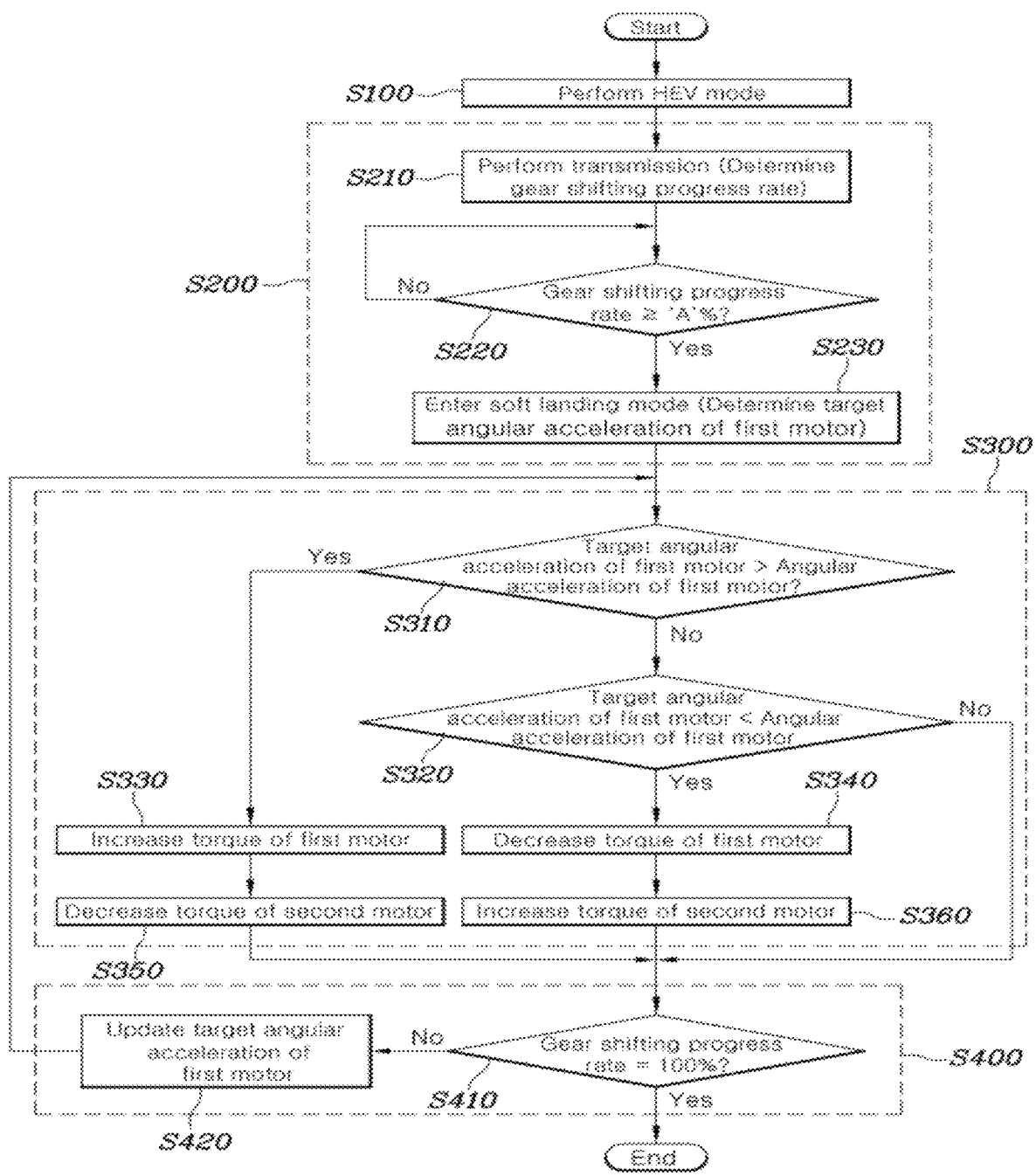
FIG. 6 is a flow chart describing a control method of a hybrid electric vehicle according to an embodiment of the present disclosure.

FIG. 6 is a flow chart describing a control method of a hybrid electric vehicle according to an embodiment of the present disclosure.

In FIG. 6, a method for controlling the hybrid electric vehicle includes: connecting the first motor 120 and the second motor 140 via the DMF 125 in the HEV mode (S100); and determining a target angular acceleration of the first motor 120 when a gearshift is performed in the transmission 150 (S200). The method further includes: controlling a torque of the first motor 120 and the second motor 140 based on the target angular acceleration of the first motor 120 (S300); and updating a target angular acceleration of the first motor 120 (S400).

In the connecting step S100, the soft landing mode control unit 243 may determine whether the first motor 120 is connected to the second motor 140 via the DMF 125 through the coupling of the engine clutch 130 based on the engine clutch state information received from the clutch control unit 230.

Determining the target angular acceleration of the first motor 120 (Step S200), when the gearshift is performed in the transmission 150, may be performed to determine the target angular acceleration of the first motor 120 according to the gear shifting progress rate so that the angular acceleration of the first motor 120 follows the target angular acceleration of the transmission input terminal.

More specifically, determining the target angular acceleration of the first motor 120 (Step S200) includes: determining the gear shifting progress rate when a gearshift is performed in the transmission 150 (S210), determining to enter the soft landing mode according to the gear shifting progress rate (S220), and determining a target angular acceleration of the first motor 120 when entering the soft landing mode (S230).

In step S210 of determining the gear shifting progress rate, the gear shifting progress rate determination unit 241 may determine the gear shifting progress rate on the actual shift section according to a difference between the target angular velocity of the transmission input terminal and the angular velocity of the second motor 140.

In step S220 of determining when the shifting progress rate is greater than or equal to a predetermined progress rate, the soft landing mode control unit 243 may determine to enter the soft landing mode.

In step S230 of determining the target angular acceleration of the first motor 120, when entering the soft landing mode, the soft landing mode control unit 243 may determine the target angular acceleration of the first motor 120 directly connected to the engine 110 follows the target angular acceleration of the transmission input terminal.

More specifically, step S230 of determining the target angular velocity of the first motor 120 may include: determining the angular acceleration difference by subtracting the angular acceleration of the first motor 120 from the target angular acceleration of the transmission input terminal; determining a residual rate of the actual shift section based on the gear shifting progress rate for the actual shift section, and determining an amount of angular acceleration correction according to the ratio of the angular acceleration difference to the residual rate of the actual shift section; and setting the target angular acceleration of the first motor 120 by adding the amount of angular acceleration correction to the angular acceleration of the first motor 120.

In step S300 of controlling the torque, the torque calculation unit 245 may control the torque of the first motor 120 and the second motor 140 by sending a torque command of the first motor 120 based on the target angular accelerations of the first motor 120 and the second motor 140, respectively.

In one embodiment, controlling the torque (Step S300) may include: comparing a target angular acceleration of the first motor 120 and angular acceleration of the first motor 120 (S310 and S320), controlling the torque of the first motor 120 (S330 and S340), and controlling the torque of the second motor 140 (S350 and S360).

In another embodiment, controlling the torque of the first motor 120 (Steps S330 and S340) may include: increasing the torque of the first motor 120 when the target angular acceleration of the first motor 120 is greater than the angular acceleration of the first motor 120 (S330); and decreasing the torque of the first motor 120 when the target angular acceleration of the first motor 120 is less than the angular acceleration of the first motor 120 (S340).

In one embodiment, controlling the torque of the second motor 140 (Steps S350 and S360) may include: decreasing the torque of the second motor 140 by the amount of increased torque of the first motor 120 when the target angular acceleration of the first motor 120 is greater than the angular acceleration of the first motor 120 (S350); and increasing the torque of the second motor 140 by the amount of decreased torque of the first motor 120 when the target angular acceleration of the first motor 120 is less than the angular acceleration of the first motor 120 (S360).

In steps S310 and S320 of comparing the target angular acceleration of the first motor 120 and the angular acceleration of the first motor 120, when the target angular acceleration of the first motor 120 is the same as the angular acceleration of the first motor 120, the torque of the first motor 120 and the second motor 140 may be maintained.

In one embodiment, updating the target angular acceleration of the first motor 120 (Step S400) may be performed to update the target angular acceleration of the first motor 120 according to the gear shifting progress rate until the actual shift section ends based on the shifting progress rate for the actual shift section.

More specifically, updating the target angular acceleration of the first motor 120 (Step S400) may include: determining to enter the actual shift section based on the gear shifting progress rate for the actual shift section (S410); and updating the target angular acceleration of the first motor 120 when the actual shift section is in progress (S420).

In step S410 of determining the progress of the actual shift section, the soft landing mode control unit 243 configures to: determine that the actual shift section is ended when the gear shifting progress rate approaches 100%; and determine that the actual shift section is in progress when the gear shifting progress rate is less than 100(%).

In step S420 of updating the target angular acceleration of the first motor 120, the soft landing mode control unit 243 may control to perform the soft landing mode by updating the target angular acceleration of the first motor 120 according to the gear shifting progress rate in the case of the actual shift section is in progress. Accordingly, in step S300 of controlling the torque, based on the target angular acceleration of the updated first motor 120, the torque calculation unit 245 may control the torque of the first motor 120 and the second motor 140 by sending torque commands of the first motor 120 and the second motor 140, respectively, to the MCU 220.

According to the present disclosure described above, by controlling the target angular acceleration of the first motor 120 directly connected to the engine 110 is controlled to follow the target angular acceleration of the transmission input terminal, synchronizing the target angular velocity of the transmission input terminal to the angular velocity of the engine 110 is illustrated. But, according to an embodiment, the angular acceleration of the engine 110 may be directly controlled to follow the target angular acceleration of the transmission input terminal.

In addition, the above-described image display methods can be implemented in a program recorded medium as computer-readable codes. The computer-readable media may include all kinds of recording devices in which data readable by a computer system are stored. Examples of computer-readable medium includes hard disk drive (HHD), solid state disk (SSD), silicon disk drive (SDD), ROM, RAM, CD-ROM, magnetic tape, floppy disk, optical data storage device, and the like. Therefore, the above embodiments are therefore to be construed in all aspects as illustrative and not restrictive. It is intended that the present disclosure covers the modifications and variations of this disclosure as well as their equivalents.

What is claimed is:

1. A method for controlling a hybrid electric vehicle comprising:
   connecting a first motor directly connected to an engine to a second motor directly connected to a transmission input terminal through a dual mass flywheel of the hybrid electric vehicle;
   determining a target angular acceleration of the first motor based on a gear shifting progress rate so that an angular acceleration of the first motor follows the target angular acceleration of the transmission input terminal when a gearshift is performed in the transmission; and controlling, by a controller, a torque of the first motor based on the target angular acceleration of the first motor.

2. The method of claim 1, wherein
the target angular acceleration of the transmission input terminal is a rate of change of a target angular velocity of the transmission input terminal determined by a gear ratio of a target gear and an angular velocity of a transmission output terminal.

3. The method of claim 1, wherein
the gear shifting progress rate increases as an angular velocity of the second motor approaches a target angular velocity of the transmission input terminal.

4. The method of claim 3, wherein the gear shifting progress rate determined according to a ratio of a difference between a reference angular velocity of the transmission input terminal and the angular velocity of the second motor to a difference between the reference angular velocity of the transmission input terminal and the target angular velocity of the transmission input terminal, and
wherein the reference angular velocity of the transmission input terminal is determined by a gear ratio of a currently engaged gear and an angular velocity of a transmission output terminal.

5. The method of claim 1, wherein determining the target angular acceleration of the first motor is performed to determine the target angular acceleration of the first motor when the gear shifting progress rate is greater than or equal to a predetermined progress rate.

6. The method of claim 1, wherein determining the target angular acceleration of the first motor comprises:
determining an angular acceleration difference by subtracting the angular acceleration of the first motor from the target angular acceleration of the transmission input terminal;
determining a residual rate of an actual shift section based on the gear shifting progress rate for the actual shift section;
determining an angular acceleration correction amount according to a ratio of the angular acceleration difference to the residual rate of the actual shift section; and
setting the target angular acceleration of the first motor by adding the angular acceleration correction amount to the angular acceleration of the first motor.

7. The method of claim 1, wherein controlling the torque comprises:
increasing the torque of the first motor when the target angular acceleration of the first motor is greater than the angular acceleration of the first motor; and
decreasing the torque of the first motor when the target angular acceleration of the first motor is less than the angular acceleration of the first motor.

8. The method of claim 7, wherein controlling the torque comprises:
decreasing the torque of the second motor by an amount of increased torque of the first motor when the target angular acceleration of the first motor is greater than the target acceleration of the first motor; and
increasing the torque of the second motor by an amount of decreased torque of the first motor when the target angular acceleration of the first motor is less than the angular acceleration of the first motor.

9. The method of claim 1, wherein updating the target angular acceleration of the first motor based on the gear shifting progress rate until an actual shift section ends based on the gear shifting progress rate for the actual shift section.

10. A non-transitory computer-readable recording medium storing instructions to be executed by a processor, the instructions causing the processor to:
in a state where a first motor directly connected to an engine is connected to a second motor directly connected to a transmission input terminal through a dual mass flywheel of a hybrid electric vehicle,
determine a target angular acceleration of the first motor based on a gear shifting progress rate so that an angular acceleration of the first motor follows the target angular acceleration of the transmission input terminal when a gearshift is performed in the transmission; and
control a torque of the first motor based on the target angular acceleration of the first motor.

11. A hybrid electric vehicle comprising:
an engine;
a first motor directly connected to the engine;
a second motor configured for selective connection to the first motor;
a transmission having an input terminal directly connected to the second motor; and
a controller,
wherein in a state where the first motor and the second motor are connected through a dual mass flywheel and performing a gearshift in the transmission, the controller is configured to determine a target angular acceleration of the first motor according to a gear shifting progress rate so that an angular acceleration of the first motor follows a target angular acceleration of the transmission input terminal when the gearshift is performed in the transmission, and the controller is further configured to control a torque of the first motor based on the target angular acceleration of the first motor.

12. The hybrid electric vehicle of claim 11, wherein
the target angular acceleration of the transmission input terminal is a rate of change of a target angular velocity of the transmission input terminal determined by a gear ratio of a target gear and an angular velocity of a transmission output terminal.

13. The hybrid electric vehicle of claim 11, wherein the gear shifting progress rate increases as an angular velocity of the second motor approaches a target angular velocity of the transmission input terminal.

14. The hybrid electric vehicle of claim 13, wherein
the gear shifting progress rate is determined according to a ratio of a difference between a reference angular velocity of the transmission input terminal and an angular velocity of the second motor to a difference between the reference angular velocity of the transmission input terminal and a target angular velocity of the transmission input terminal, and
wherein the reference angular velocity of the transmission input terminal is determined by a gear ratio of a current engaged gear and an angular velocity of a transmission output terminal.

15. The hybrid electric vehicle of claim 11, wherein
the controller is configured to determine the target angular acceleration of the first motor when the gear shifting progress rate is greater than or equal to a predetermined progress rate.

16. The hybrid electric vehicle of claim 11, wherein the controller is configured to:
determine an angular acceleration difference by subtracting the angular acceleration of the first motor from the target angular acceleration of the transmission input terminal, determine an angular acceleration correction amount according to a ratio of the angular acceleration difference to a residual rate of an actual shift section, and set the target angular acceleration of the first motor by adding the angular acceleration correction amount to the angular acceleration of the first motor, and wherein the residual rate of the actual shift section is determined based on the gear shifting progress rate for the actual shift section.

17. The hybrid electric vehicle of claim 11, wherein the controller is further configured to:

increase the torque of the first motor when the target angular acceleration of the first motor is greater than the angular acceleration of the first motor, and decrease the torque of the first motor when the target angular acceleration of the first motor is less than the angular acceleration of the first motor.

18. The hybrid electric vehicle of claim 17, wherein the controller is further configured to:

decrease the torque of the second motor by an amount of increased torque of the first motor when the target angular acceleration of the first motor is greater than the angular acceleration of the first motor, and increase the torque of the second motor by an amount of decreased torque of the first motor when the target angular acceleration of the first motor is less than the angular acceleration of the first motor.

19. The hybrid electric vehicle of claim 11, wherein the controller is further configured to update the target angular acceleration of the first motor according to the gear shifting progress rate until an actual shift section ends based on the gear shifting progress rate for the actual shift section.

* * * * *